(12) United States Patent
Bujard et al.

(10) Patent No.: US 7,976,744 B2
(45) Date of Patent: Jul. 12, 2011

(54) PROCESS OF USING MICROWAVE DEPOSITION OF METAL OXIDE ONTO AN ORGANIC SUBSTRATE

(75) Inventors: Patrice Bujard, Courtepin (CH); Rong Xiong, Dobbs Ferry, NY (US)

(73) Assignee: BASF SE, Ludwigshafen (DE)

( * ) Notice: Subject to any disclaimer, the term of this patent is extended or adjusted under 35 U.S.C. 154(b) by 25 days.

(21) Appl. No.: 11/792,746

(22) PCT Filed: Dec. 5, 2005

(86) PCT No.: PCT/EP2005/056464
§ 371 (c)(1),
(2), (4) Date: Jun. 12, 2007

(87) PCT Pub. No.: WO2006/063949
PCT Pub. Date: Jun. 22, 2006

(65) Prior Publication Data
US 2008/0185099 A1    Aug. 7, 2008

(51) Int. Cl.
*B29B 9/00* (2006.01)
*B05D 7/00* (2006.01)

(52) U.S. Cl. ............... 264/7; 264/10; 264/430; 264/489; 427/214

(58) Field of Classification Search ............... 264/10, 264/7, 430, 489; 427/214
See application file for complete search history.

(56) References Cited

U.S. PATENT DOCUMENTS

| | | | |
|---|---|---|---|
| 3,138,475 A | 6/1964 | Schroder et al. | 106/291 |
| 4,340,479 A * | 7/1982 | Pall | 210/490 |
| 5,766,335 A * | 6/1998 | Bujard et al. | 106/404 |
| 6,238,471 B1 | 5/2001 | Vogt et al. | 106/417 |
| 6,743,285 B1 | 6/2004 | Anselmann et al. | 106/415 |
| 7,256,425 B2 * | 8/2007 | Weinert et al. | 257/77 |
| 7,455,726 B2 * | 11/2008 | Schoenefeld et al. | 106/479 |

(Continued)

FOREIGN PATENT DOCUMENTS
WO    03/068868    8/2003
(Continued)

OTHER PUBLICATIONS
Peiro et al., Thin solid Films vol. 411 No. 2(May 2002) pp. 185-191.

*Primary Examiner* — Yogendra N Gupta
*Assistant Examiner* — Jeremiah Smith
(74) *Attorney, Agent, or Firm* — Qi Zhuo

(57) ABSTRACT

The present invention is directed to a process for the preparation of a plane-parallel structure (a platelet-shaped body, or flake), comprising at least one dielectric layer consisting of one or more oxides of a metal selected from groups 3 to 15 of the periodic table, which comprises the steps of: (a) applying a thin film of the dielectric material on a flexible belt, by passing the belt through an aqueous solution of a fluorine scavenger and one or more fluorine containing metal complexes which are the precursors of the desired metal oxide coating; and subjecting said solution to microwave radiation to deposit the metal oxide onto said flexible belt, wherein step (a) can optionally be repeated using different fluorine containing metal complexes to produce one or more metal oxide layers or a gradient of concentration of 2 different metal oxides across the thickness; (b) separating the resulting layer from the flexible belt as plane-parallel structures.

19 Claims, 1 Drawing Sheet

U.S. PATENT DOCUMENTS

| | | | |
|---|---|---|---|
| 2002/0147108 A1* | 10/2002 | Sato et al. | 502/350 |
| 2003/0047115 A1* | 3/2003 | Bauer et al. | 106/415 |
| 2004/0265507 A1 | 12/2004 | Xiong et al. | 427/561 |
| 2005/0013934 A1 | 1/2005 | Xiong et al. | 427/212 |
| 2005/0161678 A1 | 7/2005 | Weinert et al. | 257/77 |
| 2005/0287090 A1* | 12/2005 | Bujard | 424/63 |

FOREIGN PATENT DOCUMENTS

| | | | |
|---|---|---|---|
| WO | WO/2004/035694 | * | 4/2004 |
| WO | 2004/111298 | | 12/2004 |
| WO | 2004/113455 | | 12/2004 |
| WO | WO/2004/104110 | * | 12/2004 |

* cited by examiner

PROCESS OF USING MICROWAVE DEPOSITION OF METAL OXIDE ONTO AN ORGANIC SUBSTRATE

The invention relates to a process of using microwave deposition of a metal oxide or mixed metal oxides from an aqueous solution of fluorine scavenger onto a flexible belt.

Methods involving deposition of a metal oxide layer via liquid phase decomposition (hydrolysis) of a corresponding salt (i.e. sulfate or halide) are known per se and have been used to form luster, or pearlescent pigments which have translucent, non-reflective mica core materials. However, such methods, described for example in U.S. Pat. No. 3,087,827 and U.S. Pat. No. 5,733,371, have not been considered suitable for forming effect pigments with reflective metallic cores in the highly acid (pH of less than 4), aqueous solutions required by such processes. U.S. Pat. No. 6,369,147 discloses a process that solves the foregoing problem by selecting certain metal cores and optionally treating them in such a way that they are rendered more corrosion resistant.

Use of microwave energy for the deposition of metal oxide films onto glass and indium tin oxide coated glass plates used for LED devices is known and disclosed in numerous journal articles such as E. Vigil, L. Saadoun, Thin Solid Films 2000, 365, pp 12-18 and E. Vigil, L. Saadoun, J. Materials Science Letters 1999, 18 pp 1067-1069. Good adhesion was obtained only on indium tin oxide coated glass plates, which the authors suggested was due to some electron donation ability of the indium tin oxide coating (see Vigil, E.; Ayllón, J. A.; Peiró, A. M.; Rodríguez-Clemente, R.; Domènech, X.; Peral, J. Langmuir 2001, 17, 891).

The bulk precipitation of metal oxide particles by microwave irradiation is well known. For examples of bulk precipitation oxides using microwave deposition, see (1) Lerner, E.; Sarig, S.; Azoury, R., Journal of Materials Science: Materials in Medicine 1991, 2, 138 (2) Daichuan, D.; Pinjie, H.; Shushan, D. Materials Research Bulletin, 1995, 30, 537 (3) Leonelli, C. et al., Microwaves: Theory and Applications in Materials Processing 2001, 111, 321, (4) Girnus, I. et al., Zeolites 1995, 15, 33, (5) Rodríguez-Clemente, R. et al., Journal of Crystal Growth 1996, 169, 339 and (6) Daichuan, D.; Pinjie, H.; Shushan, D. Materials Research Bulletin, 1995, 30, 531.

Surprisingly, applicants have found that use of the microwave deposition process of the present invention allows for a process for the deposition of uniform, semi-transparent or transparent, thin films of metal oxides of uniform thickness, which thickness can be adjusted based upon the mass of metal oxide precursor material allowing for the preparation of thin films of metal oxides of a variety of thicknesses depending upon the desired effect without precipitation of the metal oxide. With microwave treatment, energy is focused on the substrate material (belt) due to the better absorbance of the microwave energy by the substrate than the bulk mixture. The easy adjustment of reaction conditions to change the thickness or composition of the coating, as well as minimal deposition into the bulk media, are significant advantages of the instant invention.

Accordingly, it is an object of the invention to provide a process of using microwave deposition of metal oxide layers onto an organic substrate as defined hereinafter.

The present invention relates to a process for the preparation of a plan-parallel structure (a platelet-shaped body, or flake), comprising at least one dielectric layer consisting of one or more oxides of a metal selected from groups 3 to 15 of the periodic table, which comprises the steps of:

(a) applying a thin film of the dielectric material on a flexible belt, by passing the belt through an aqueous solution of a fluorine scavenger and one or more fluorine containing metal complexes which are the precursors of the desired metal oxide coating; and subjecting said solution to microwave radiation to deposit the metal oxide onto said flexible belt, wherein step (a) can optionally be repeated using different fluorine containing metal complexes to produce one or more metal oxide layers or a gradient of concentration of 2 different metal oxides across the thickness;

(b) separating the resulting layer from the flexible belt as plane-parallel structures.

Figure 1:
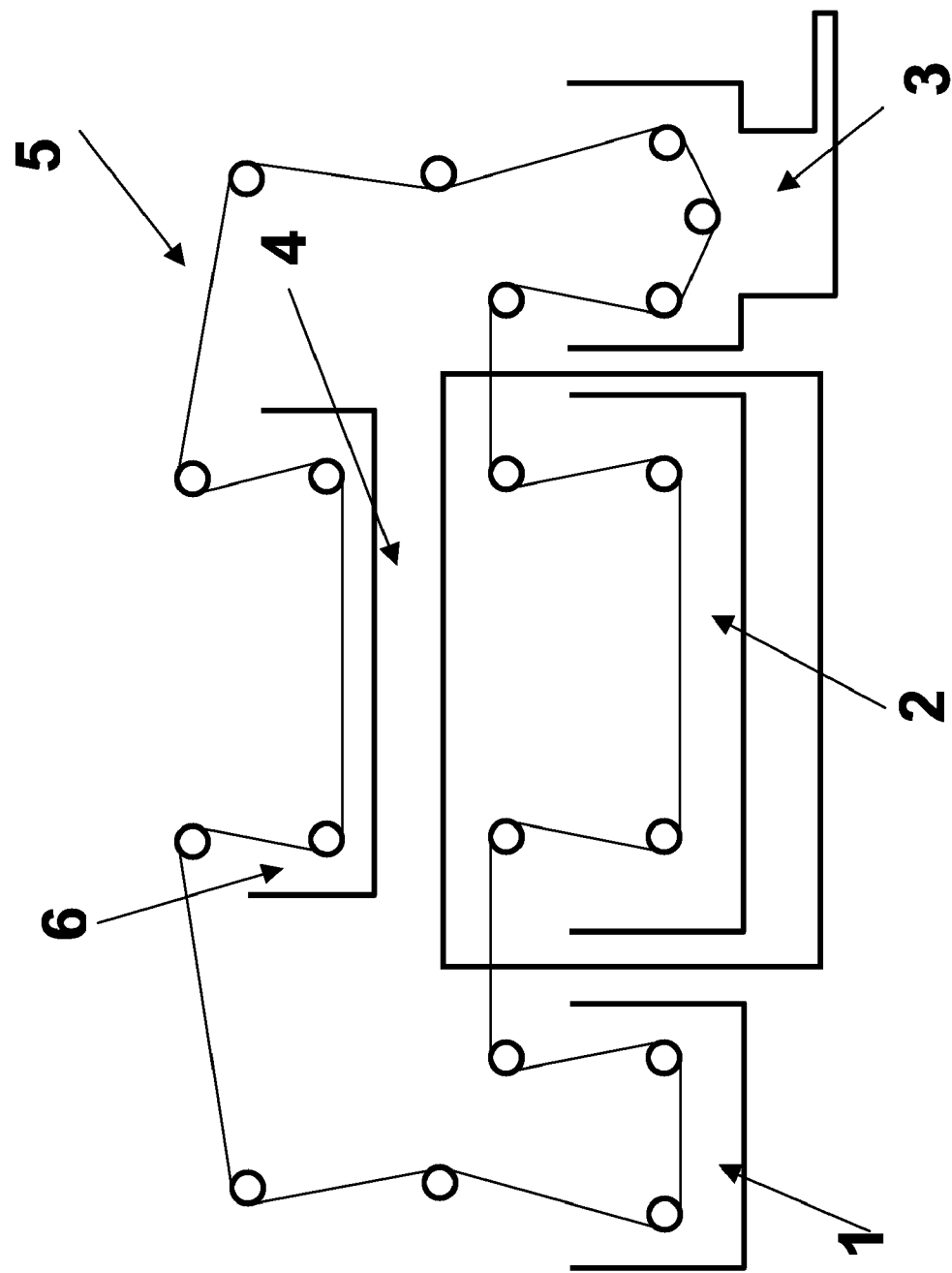
FIG. 1. is a schematic cross sectional view illustrating the flexible belt of the present invention.

The flexible belt is preferably a continuous, or endless belt made of any material suitable to be passed through a working microwave cavity. The belt is chemically and physically stable at the said processing temperature, and under other conditions such as contact with separating agent, reaction mixture and solvent used.

The flexible belt is preferably coated with a separating agent before step (a) and (b) the separation the resulting layer from the flexible belt is achieved by dissolving the separating agent in a suitable solvent.

Generally, the belt, which has optionally been coated with a release layer, is passed through the aqueous solution comprising the fluorine scavenger and the fluorine containing metal complex which is microwave irradiated. The fluorine scavenger and the fluorine containing metal complex are added continuously to the aqueous solution. Preferably, the concentrations of both the metal oxide precursor and the fluorine scavenger in the solution are kept constant by a remote controller. The metal oxide layer growths on the band during microwave irradiation. Its thickness depends on the microwave intensity, the water bath temperature, the precursor concentration and the speed of the (conveyor) belt.

Optionally, the flexible belt is further coated with a thin film of at least one electrically conductive material. The at least one electrically conductive material is either a metal or a transparent electrically conductive metal oxide. In case that the electrically conductive material is a metal, said metal is preferably copper or aluminium. Preferred electrically conductive metal oxides are tin or titanium oxide dotted with halogen atoms. Suitable aqueous precursor solutions for the preparation of the electrically conductive metal oxide layer are known and described in numerous journal articles such as Vigil et al., Thin Solid Films 2000, 365, 12 and Vigil et al., J. Langmuir 2001, 17, 891. The conductivity of the electrically conductive layer is preferably between $10^{-2}$ to 100 ohm per square, more preferably between 1 to 10 ohm per square. Due to the improved heating properties of the electrically conductive material, film growth is more easily activated by microwave radiation heating.

The fluorine scavenger is preferably any compound that can scavenge fluorine ions in aqueous solution such as boric acid, an alkali metal borate such as sodium borate, ammonium borate, boron anhydride or boron monoxide, particularly preferably ammonium borate. In one embodiment of the invention, ammonium borate is used. The concentration of the ammonium borate solution is at least that which is required to scavenge fluoride ion during the deposition of the metal oxide coating on the organic material. In one embodiment an excess of the ammonium borate is used. Typically the ammonium borate is used in the range of about 0.01~1.0 M, preferably about 0.05~0.5 M, based upon the total amount of aqueous solution. The process can be conveniently carried out between about 15° C. and about 95° C. The temperature can be adjusted by tuning the power output of the microwave magnetron or setting the power output at constant while changing the time intervals of power on and off.

The oxides of elements of the groups 3 to 15 of the periodic table are deposited on the belt in the process of the present invention by adding a solution of a fluorine containing metal complex which is a precursor of the desired metal oxide and applying microwave energy. Generally, the aqueous solution is added continuously in order to limit the precipitation of the metal oxide other than by deposition onto the belt. The metal oxides that are suitable for coating the substrate material and subsequent layers of metal oxide are well known in the art and include $TiO_2$, $ZrO_2$, $CoO$, $SiO_2$, $SnO_2$, $GeO_2$, $ZnO$, $Al_2O_3$, $V_2O_5$, $Fe_2O_3$, $Sb_2O_3$, $Cr_2O_3$, $PbTiO_3$ or $CuO$ or a mixture thereof. Particular preference is given to silicon dioxide. The precursor solution that forms the desired metal oxide is preferably an aqueous solution of one or a combination of the following materials:

(a) a soluble metal fluoride salt,
(b) a soluble metal fluorine complex, or
(c) any mixture that forms said salt or complex.

Examples include ammonium hexafluorotitanate; a complex prepared from ammonium fluoride and titanium chloride or titanium chloride, ammonium fluoride and hydrogen fluoride; ammonium hexafluorostanate; ammonium hexafluorosilicate; ammonium pentafluorosilicate; iron(III) chloride, hydrofluoric acid and ammonium fluoride mixtures; aluminum(III) chloride, hydrofluoric acid and ammonium fluoride mixtures; ammonium hexafluorogermanate; and a combination of indium(III) fluoride trihydrate and ammonium hexafluorostanate. In the last example it forms metal oxide films comprising more than one element—indium/tin oxide films. The concentration of the fluorine containing metal complex is not critical to the process and is dictated by what is easy to handle because the mixture can be irradiated until the desired thickness is obtained at a constant belt speed. Thus, the concentration may range from about 0.01 M up to a saturated solution. In one embodiment of the invention a solution of ammonium hexafluorosilicate at a range of about 0.2 M to about 0.4 M is used, based upon the total amount of aqueous solution.

For producing a mixed interference/absorption effect, the metal oxide layer of dielectric material is preferably a colored (selectively absorbing, not gray or black) oxide or colored mixed oxides of elements of groups 5 to 12. A most preferred metal oxide layer comprises $Fe_2O_3$.

A colored metal oxide layer and/or colored metal oxide flakes can be produced, when the deposition of the metal oxide is carried out in the presence of a colorant, especially an organic pigment, or carbon black. Suitable organic pigments are, for example, described in W. Herbst and K. Hunger, VCH Verlagsgesellschaft mbH, Weinheim/New York, 2nd, completely revised edition, 1995 and are, for example, selected from the group consisting of azo, azomethine, methine, anthraquinone, phthalocyanine, perinone, perylene, diketopyrrolopyrrole, thioindigo, iminoisoindoline, dioxazine, iminoisoindolinone, quinacridone, flavanthrone, indanthrone, anthrapyrimidine and quinophthalone pigments, or a mixture or solid solution thereof; especially an azo, dioxazine, perylene, diketopyrrolopyrrole, quinacridone, phthalocyanine, indanthrone or iminoisoindolinone pigment, or a mixture or solid solution thereof.

Notable pigments useful in the present invention are those pigments described in the Color Index, including the group consisting of C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Yellow 191.1, C.I. Pigment Yellow 74, C.I. Pigment Yellow 83, C.I. Pigment Yellow 13, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, and C.I. Pigment Green 36, or a mixture or solid solution thereof.

The metal oxide layer of the dielectric material can also be modified by incorporating therein a luminescent material.

The term "luminescence" means the emission of light in the visible, UV- and IR-range after input of energy. The luminescent material can be a fluorescent material, a phosphorescent material, an electroluminescent material, a chemoluminescent material, a triboluminescent material, or other like materials. Such luminescent materials exhibit a characteristic emission of electromagnetic energy in response to an energy source generally without any substantial rise in temperature.

The luminescent compound can be an organic luminescent compound, or composition, i.e. a luminescent colorant, wherein the term colorant comprises dyes as well as pigments, or an inorganic phosphor.

Preferred fluorescent colorants are based on known colorants selected from coumarins, benzocoumarins, xanthenes, benzo[a]xanthenes, benzo[b]xanthenes, benzo[c]xanthenes, phenoxazines, benzo[a]phenoxazines, benzo[b]phenoxazines and benzo[c]phenoxazines, napthalimides, naphtholactams, azlactones, methines, oxazines and thiazines, diketopyrrolopyrroles, perylenes, quinacridones, benzoxanthenes, thio-epindolines, lactamimides, diphenylmaleimides, acetoacetamides, imidazothiazines, benzanthrones, perylenmonoimides, perylenes, phthalimides, benzotriazoles, pyrimidines, pyrazines, and triazines. In a preferred embodiment of the present invention the luminescent colorant is the condensation product of

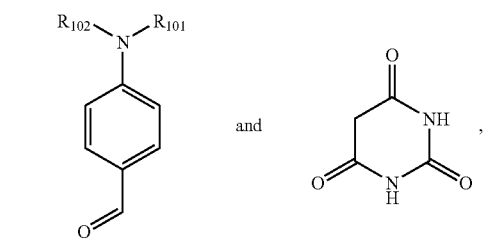

wherein $R_{101}$ and $R_{102}$ are independently hydrogen or $C_1$-$C_{18}$ alkyl, such as for example, methyl, ethyl, n-propyl, isopropyl, n-butyl, sec-butyl, isobutyl, tert-butyl, n-amyl, tert-amyl, hexyl, heptyl, octyl, 2-ethylhexyl, nonyl, decyl, dodecyl, tet radecyl, hexadecyl or octadecyl. Preferably $R_{101}$ and $R_{102}$ are methyl. The condensation product is of formula

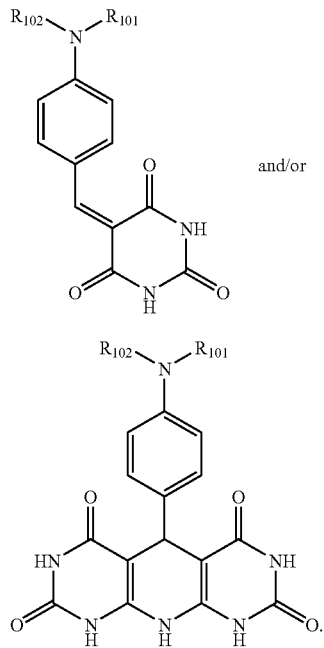

The organic luminescent compound can also be an optical brightener which is preferably selected from distyrylbenzenes, distyrylbiphenyls, divinylstilbenes, triazinylaminostilbenes, stilbenzyl-2h-triazoles, benzoxazoles, furans, benzo[b]furans, and benzimidazoles, 1,3-diphenyl-2-pyrazolines, coumarins, naphthalimides, and 1,3,5-triazin-2-yl derivatives.

The inorganic phosphor is preferably selected from sulfides and selenides, such as zinc and cadmium sulfides and sulfoselenides, alkaline-earth sulfides and sulfoselenides, and oxysulfides, oxygen-dominant phosphors, such as borates, aluminates, silicates, halophosphates and phosphates, germanates, oxides, arsenates, vanadates, sulfates, and tungstates and molybdates, and halide phosphors, especially $Zn_{1-x}Cd_xS$ ($0 \leqq x \leqq 0.3$), optionally comprising activators, such as copper and silver, manganese, gold, rare earths, and zinc; MgS, or CaS, activated with rare earths, such as europium, cerium, or samarium; $Y_2O_2S:Eu^{3+}$, $Y_2O_2S:Tb^{3+}$, $Gd_2O_2S:Tb^{3+}$, $Sr_3B_{12}O_{20}F_2:Eu^{2+}$, $Y_3Al_5O_{12}:Ce^{3+}$, $Ce_{0.65}Tb_{0.35}MgAl_{11}O_{19}$, $BaMg_2Al_{16}O_{27}:Eu^{2+}$, $Y_2Al_3Ga_2O_{12}:Tb^{3+}$, $ZnSiO_4:Mn$, $Y_2SiO_5:Ce^{3+}$, 3 $Ca_3(PO_4)_2.Ca(F, Cl)_2:Sb^{3+}$, $Mn^{2+}$, $(Sr,Mg)_3 (PO_4)_2:Sn^{2+}$; $LaPO_4:Ce^{3+}$, $Tb^{3+}$; $Zn_3(PO_4)_2$: $Mn^{2+}$; $Cd_5Cl(PO_4)_2:Mn^{2+}$; $Sr_3(PO_4)_2.SrCl_2:Eu^{2+}$; and $Ba_2P_2O_7:Ti^{4+}$, 3 $Sr_3(PO_4)_2.SrCl_2$: $Eu^{2+}$, $Y_2O_3:Eu^{3+}$, $Y_2O_3:Eu^{3+}$, $Tb^{3+}$, $ZnO:Zn$, 6 $MgO.As_2O_5$: $Mn^{4+}$, $YVO_4:Eu^{3+}$, alkali-metal and alkaline-earth sulfates activated with $Ce^{3+}$ and optionally manganese; $MgWO_4$, $CaWO_4$, alkali-metal halides, optionally comprising Tl, Ga, or In, such as LiI/Eu, NaI/Tl, CsI/Tl, CsI/Na, LiF/Mg, LiF/Mg, Ti and LiF/Mg, Na; $CaF_2:Mn$; $CaF_2:Dy$, $(Zn, Mg)F_2$: $Mn^{2+}$, $KMg F_3:Mn^{2+}$, $MgF_2:Mn^{2+}$, $(Zn, Mg)F_2:Mn^{2+}$, $LaOCl:Tb^{3+}$, $LaOBr:Tb^{3+}$ and $LaOBr:Ce^{3+}$.

Owing to its uncopyable optical effects, the luminescent metal oxide flakes, especially $SiO_2$ flakes according to the invention can be used for the production of forgery-proof materials from paper and plastic. For that purpose it might be advantageous to coat the luminescent metal oxide flakes with further metal oxide (interference) layers). In addition, the pigment according to the invention can also be used in formulations such as paints, printing inks, varnishes, in plastics, ceramic materials and glasses, in cosmetics, for laser marking of paper and plastics and for the production of pigment preparations in the form of pellets, chips, granules, briquettes, etc.

The term forgery-proof materials made from paper is taken to mean, for example, documents of value, such as banknotes, cheques, tax stamps, postage stamps, rail and air tickets, lottery tickets, gift certificates, entry cards, forms and shares. The term forgery-proof materials made from plastic is taken to mean, for example, cheque cards, credit cards, telephone cards and identity cards. For the production of printing inks, the luminescent $SiO_2$ flakes are incorporated into binders which are usually suitable for printing inks. Suitable binders are cellulose, polyacrylate-polymethacrylate, alkyd, polyester, polyphenol, urea, melamine, polyterpene, polyvinyl, polyvinyl chloride and polyvinylpyrrolidone resins, polystyrenes, polyolefins, coumarone-indene, hydrocarbon, ketone, aldehyde and aromatic-formaldehyde resins, carbamic acid, sulfonamide and epoxy resins, polyurethanes and/or natural oils, or derivatives of the said substances. Besides the film-forming, polymeric binder, the printing ink comprises the conventional constituents, such as solvents, if desired water, antifoams, wetting agents, constituents which affect the rheology, antioxidants, etc.

The process of the present invention is explained in more detail below on the basis of metal oxide flakes, i.e. products which consist of one metal oxide layer, but is not limited thereto.

The flakes according to the invention are preferably prepared in a continuous process with the aid of a continuous belt, for example in a continuous belt process, or in a continuous, or quasi-continuous drum process.

First, the belt process will be illustrated on the basis of FIG. 1.

The continuous belt 5, which is guided by a roller system, runs through an application section 1, where it is coated with a release layer. The application section 1 consists of a bath comprising the release material dissolved in an organic solvent. The release layer is deposited on both sides of the belt 5. The organic material used as release layer should form a smooth continuous layer on the conveyor belt 5 during drying. Drying may be done in a drying section right after the first application section 1.

Then, the continuous belt 5 runs through an application section 2, where it is coated with a thin film of the metal oxide. The application section 2 consists of a bath comprising the metal oxide precursor and the boric acid in a solution of water and a microwave unit. The concentrations of both the solution of the metal oxide precursor and the boric acid are kept constant by a remote controller. The metal oxide layer growths on the release layer during microwave irradiation. Its thickness depends on the microwave intensity, the water bath temperature, the precursor concentration and the speed on the conveyor belt 5.

If a colorant is incorporated in the metal oxide layer, the colorant is dispersed or dissolved in the aqueous solution of the fluorine containing metal complex and/or the boric acid before application to the belt 5. The colorant particles are dispersed in the precursor by known methods, for example by ultrasonic treatment.

The coated belt is then passed through a drying zone, which can consist of one or more sections. The drying can be achieved by infrared rays, by microwaves, by hot air etc. A preferred embodiment of the drying zone consists of a predrying device, in which the film is treated with hot air of temperature 80-150° C., and a following IR drying device. Apart from this, however, other embodiments of the drying zone are also possible.

The formed metal oxide layer is then removed from the belt by a device. Removal can either take place mechanically by scraping or brushing or without contact by dissolution of a "release layer" or by ultrasound. Removal with a liquid has proven advantageous. For that purpose the belt passes a third bath 3 comprising a solvent, which dissolves the organic release layer on the belt and allows the metal oxide layer to be removed from the conveyor belt.

Examples of organic release layers are diphenic acid and phenolphthalein, which are soluble in alcoholic solutions, such as methanol, ethanol and isopropanol.

The conveyor belt runs forward through a cleaning unit 6 before entering again the application section 1.

If it is intended to coat the metal oxide platelets with further metal oxide layers, a wet-chemical reaction step is inserted after the belt process, in which the platelet-shaped metal oxide material is suspended in water and coated with a smooth metal oxide or metal hydroxide covering layer by addition of one or more metal salt solutions at a pH suitable for the deposition of the respective metal oxides or metal hydroxides. Mixed oxide or hydroxide layers and also several covering layers can also be deposited successively. This subsequent wet-chemical reaction step is described in more detail below.

Coating with metals, for example, with silver, copper or gold, can be carried out in a wet-chemical process.

Instead of the arrangement described, it is also possible to use other devices. Thus, for example, a quasi-continuous process can also be carried out by means of an arrangement analogous to the device shown in U.S. Pat. No. 3,767,443, FIG. II. In that arrangement, a very long support belt is wound on a drum (item 12 of FIG. II from U.S. Pat. No. 3,767,443); the belt is then unwound via a coating section in which first a release layer and then the metal oxide film are applied. The coated support belt is then wound onto a storage drum (item 15 in FIG. II). After winding of the entire support belt is complete, the storage drum is placed in a bath in which the release layer is dissolved, as a result of which the dried metal oxide film is removed from the support belt. After dissolution of the release layer platelets are present which are removed.

The drum arrangement described can also be used for a quasi-continuous process. To this end, the support belt, after being coated with a separating agent, is coated in a first step with the metal oxide, which is then dried. After complete winding of the support belt coated with the dried metal oxide film onto the storage drum, the container comprising the aqueous solution of the fluorine containing metal complex is exchanged for a solvent bath; the coated support belt is then unwound through the solvent bath, in which the separating agent is dissolved, during which the direction of travel of the support belt changes and the supply and storage rollers are swapped over. After going through the solvent bath and, if necessary, past a scraping device, the support belt has been freed of the metal oxide film, and a new cycle can start. This modified drum process is a variation of the continuous belt process described above and often has the advantage over the latter in that the corresponding arrangement can be built in a more compact manner; a disadvantage is that, after the belt has been completely unwound, the container comprising the aqueous solution of the fluorine containing metal complex and the solvent containers need to be changed.

The arrangements described here are to be understood as examples and are intended to illustrate the invention without limiting it. In general, continuous processes are preferred over quasi-continuous or even batchwise processes.

It has been found that the use of belts (belts) based on thermally stable plastics is in many cases advantageous. The softening temperature of the plastic should preferably not be less than 150° C. and in particular not less than 180° C., in order to ensure sufficiently high drying temperatures. Furthermore, the plastic material should be chemically substantially inert. Examples of suitable belt materials are polyethylene terephthalate, polyamides, other polyesters and polyacrylates, this list only serving for illustration and not being intended to limit the invention. Polyesters and polyamides are preferred. The belt materials should have a maximum water absorption of less than 10% at room temperature.

The plastic belts typically have thicknesses of some 10 µm to a few mm, thicknesses of between 0.1 and 5 mm being preferred, thicknesses of below 0.5 mm being particularly preferred. However, in extreme cases thicker plastic belts can also be used. The width and length of the plastic belts is in general less critical and can be optimized with respect to the particular requirements. Plastic belts of this type usually have a smooth surface anyway.

Preferably, first a release layer is applied to the belt used as support in order to facilitate the peeling-off of the matrix film.

Instead of the organic release material mentioned above a polymeric release material can advantageously be used. Accordingly, in a preferred embodiment of the present invention an organic material carrier (belt), such as polyesters, polyolefines, polyamides or other common materials, is coated by a coating or printing technique (preferably rotogravure or flexo) with a solvent-based resin solution, such as, for example acrylics, cellulose systems, vinyl resins etc. The dried coated belt is then coated with one (or more) metal oxides by microwave deposition. The coatings are stripped from the carrier in a solvent, such as acetone. The stripping operation breaks the continuous layer into particles contained in a slurry. The slurry is then subjected to sonic treatment and centrifuging to remove the solvent and the dissolved coating, leaving a cake of concentrated metal oxide flakes. The cake is then let down in a suitable vehicle and further sized by homogenizing, for example, vigorous stirring, or ultrasonic treatment, into flakes of controlled size for use in inks, paints, and coatings. Metal oxide flakes, such as aluminum oxide, silicon oxide, indium oxide, indium tin oxide, titanium oxide, and iron oxide flakes, produced by this process are characterized by a particle size from about 1 to 100 microns and a thickness from about 10 to about 500 nm, especially 50 to 500 nm, very especially 50 to 250 nm. The flakes have a smooth mirror-like surface and a high aspect ratio.

The use of a release layer even in continuous processes has the advantage that it may be possible to do without a scraping device.

By the choice of the microwave intensity, the temperature of bath 1, the concentration of the fluorine containing metal complex, the speed of the conveyor belt, and the drying conditions, the layer thickness and the layer thickness tolerance of the substrates according to the invention can be influenced in a controlled manner and very thin particles having a layer thickness tolerance (=standard deviation of the layer thickness) of about 10% can also be obtained. Platelet-shaped metal oxide substrates, especially silicon oxide substrates having a well-defined layer thickness of 50 to 500 nm, especially 100 to 250 nm, and a well-defined layer thickness distribution are available. As a result of the plane-parallel surface and the narrow thickness tolerance of the metal oxide platelets, a very high color purity and very high color strength are achieved.

The color of pigments which contain incorporated carbon black particles can range, depending on the concentration of the carbon black particles, for example, from off-white via light grey, metal-colored, dark grey to black. Metal-colored and in particular aluminum-colored pigments are of particular interest.

By adding further application sections 2 multilayer pigments comprising multiple layers of metal oxides can be produced.

Accordingly, the process of the present invention further comprises the step of:
(a') passing the belt through an aqueous solution of a fluorine scavenger and one or more fluorine containing metal complexes which are the precursors of the desired metal oxide coating which is different from the oxide coating in step (a); and subjecting said solution to microwave radiation to deposit the metal oxide onto said flexible belt, wherein step (a') is conducted after step (a).

Step (a) and/or (a') can be repeated to form multilayer plane-parallel structures having alternating layers of metal oxides, such as, for example, A/A'/A, or A/A'/A/A'/A/A'/A, wherein A, preferably $TiO_2$, is the metal oxide layer obtained in step (a) and A', preferably $SiO_2$, is the metal oxide layer obtained in step (a'); or B/B'/B/B'/B, wherein B, preferably $SiO_2$, is the metal oxide layer obtained in step (a) and B', preferably $TiO_2$, is the metal oxide layer obtained in step (a').

If the metal oxide layers are deposited subsequently by the process of the present invention multiplayer pigments are formed having a substrate layer and on top and on bottom, but not on the sides of the substrate a metal oxide layer, or metal oxide layers. In contrast, if the process of the present invention is used to produce flakes consisting of one metal oxide layer only, which are isolated and then coated by a wet chemical process with a further metal oxide layer(s), the further metal oxide layer(s) covers the whole surface of the substrate.

Examples of preferred multilayer pigments having a substrate layer and on top and on bottom, but not on the sides of the substrate a metal oxide layer, or metal oxide layers are shown below:

$TiO_2/SiO_2/TiO_2$, $TiO_2/Al_2O_3/TiO_2$,
$TiO_2/SiO_2/TiO_2/SiO_2/TiO_2/SiO_2/TiO_2$, $TiO_2/SiO_2/TiO_2/SiO_2/TiO_2/SiO_2/TiO_2$
$Al_2O_3/TiO_2/Al_2O_3/TiO_2/Al_2O_3$, $SiO_2/TiO_2/SiO_2/TiO_2/SiO_2$,
$TiO_2/SiO_2/Fe_2O_3/SiO_2/TiO_2$, $TiO_2/Al_2O_3/Fe_2O_3/Al_2O_3/TiO_2$,
$Fe_2O_3/TiO_2/Fe_2O_3$, $SiO_2/TiO_2/SiO_2$, $Al_2O_3/TiO_2/Al_2O_3$

The present invention is illustrated in more detail on the basis of $SiO_2$ flakes as core material, but is not limited thereto.

The $SiO_2$ core particles generally have a length of from 2 μm to 5 mm, a width of from 2 μm to 2 mm, and a thickness of from 50 nm to 500 nm, especially 100 to 250 nm, and a ratio of length to thickness of at least 2:1 and two substantially parallel faces, the distance between which is the shortest axis of the core. The $SiO_2$ flakes have a high plane-parallelism and a defined thickness in the range of ±10%, especially ±5% of the average thickness.

Effect pigments manufactured according to the process of the present invention comprise in said embodiment a core material of $SiO_2$ and at least one dielectric layer consisting of one or more oxides of a metal selected from the group 3 to 15 of the periodic table.

Preferred interference pigments comprise (a) a metal oxide of high refractive index, such as $Fe_2O_3$, or $TiO_2$, and (b) a metal oxide of low refractive index, such as $SiO_2$, wherein the difference of the refractive indices is at least 0.1: $TiO_2$ (substrate: $SiO_2$; layer: $TiO_2$), $(SnO_2)TiO_2$, $Fe_2O_3$, $Sn(Sb)O_2$, $Fe_2O_3.TiO_2$ (substrate: $SiO_2$; mixed layer of $Fe_2O_3$ and $TiO_2$), $TiO_2/Fe_2O_3$ (substrate: $SiO_2$; first layer: $TiO_2$; second layer: $Fe_2O_3$). In general the layer thickness ranges from 1 to 1000 nm, preferably from 1 to 300 nm.

Another particularly preferred embodiment relates to interference pigments containing at least three alternating layers of high and low refractive index, such as, for example, $TiO_2/SiO_2/TiO_2$, $(SnO_2)TiO_2/SiO_2/TiO_2$, $TiO_2/SiO_2/TiO_2/SiO_2/TiO_2$ or $TiO_2/SiO_2/Fe_2O_3$:

Preferably the layer structure is as follows:
(A) a coating having a refractive index >1.65,
(B) a coating having a refractive index ≦1.65,
(C) a coating having a refractive index >1.65, and
(D) optionally an outer protective layer.

Examples of a dielectric material having a "high" refractive index, that is to say a refractive index greater than about 1.65, preferably greater than about 2.0, most preferred greater than about 2.2, are zinc sulfide (ZnS), zinc oxide (ZnO), zirconium oxide ($ZrO_2$), titanium dioxide ($TiO_2$), carbon, indium oxide ($In_2O_3$), indium tin oxide (ITO), tantalum pentoxide ($Ta_2O_5$), chromium oxide ($Cr_2O_3$), cerium oxide ($CeO_2$), yttrium oxide ($Y_2O_3$), europium oxide ($Eu_2O_3$), iron oxides such as iron(II)/iron(III) oxide ($Fe_3O_4$) and iron(III) oxide ($Fe_2O_3$), hafnium nitride (HfN), hafnium carbide (HfC), hafnium oxide (HfO$_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxides (SiO), selenium trioxide ($Se_2O_3$), tin oxide ($SnO_2$), tungsten trioxide ($WO_3$) or combinations thereof. The dielectric material is preferably a metal oxide. It is possible for the metal oxide to be a single oxide or a mixture of oxides, with or without absorbing properties, for example, $TiO_2$, $ZrO_2$, $Fe_2O_3$, $Fe_3O_4$, $Cr_2O_3$ or ZnO, with $TiO_2$ being especially preferred.

Nonlimiting examples of suitable low index dielectric materials that can be used include silicon dioxide ($SiO_2$), aluminum oxide ($Al_2O_3$), and metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), polymers of perfluoroalkenes, polytetrafluoroethylene (TEFLON), polymers of fluorinated ethylene propylene (FEP), parylene, p-xylene, combinations thereof, and the like. Additionally, the foregoing materials include evaporated, condensed and cross-linked transparent acrylate layers, which may be deposited by methods described in U.S. Pat. No. 5,877,895, the disclosure of which is incorporated herein by reference.

The thickness of the individual layers of high and low refractive index on the base substrate is essential for the optical properties of the pigment. The thickness of the individual layers, especially metal oxide layers, depends on the field of use and is generally 10 to 1000 nm, preferably 15 to 800 nm, in particular 20 to 600 nm.

The thickness of layer (A) is 10 to 550 nm, preferably 15 to 400 nm and, in particular, 20 to 350 nm. The thickness of layer (B) is 10 to 1000 nm, preferably 20 to 800 nm and, in particular, 30 to 600 nm. The thickness of layer (C) is 10 to 550 nm, preferably 15 to 400 nm and, in particular, 20 to 350 nm.

Particularly suitable materials for layer (A) are metal oxides, or metal oxide mixtures, such as $TiO_2$, $Fe_2O_3$, Sn(Sb)

$O_2$, $SnO_2$, titanium suboxides (reduced titanium species having oxidation states from 2 to <4), and also mixtures or mixed phases of these compounds with one another or with other metal oxides.

Particularly suitable materials for layer (B) are metal oxides or the corresponding oxide hydrates, such as $SiO_2$.

Particularly suitable materials for layer (C) are colorless or colored metal oxides, such as $TiO_2$, $Fe_2O_3$, $Sn(Sb)O_2$, $SnO_2$, titanium suboxides (reduced titanium species having oxidation states from 2 to <4), and also mixtures or mixed phases of these compounds with one another or with other metal oxides. The $TiO_2$ layers can additionally contain an absorbing material, such as carbon, selectively absorbing colorants, selectively absorbing metal cations, can be coated with absorbing material, or can be partially reduced.

Interlayers of absorbing or nonabsorbing materials can be present between layers (A), (B), (C) and (D). The thickness of the interlayers is 1 to 50 nm, preferably 1 to 40 nm and, in particular, 1 to 30 nm.

In this embodiment preferred interference pigments have the following layer structure:

| | | | |
|---|---|---|---|
| $SiO_2$ | $TiO_2$ | $SiO_2$ | $TiO_2$ |
| $SiO_2$ | $TiO_2$ | $SiO_2$ | $Fe_2O_3$ |
| $SiO_2$ | $TiO_2$ | $SiO_2$ | $TiO_2/Fe_2O_3$ |
| $SiO_2$ | $TiO_2$ | $SiO_2$ | $(Sn,Sb)O_2$ |
| $SiO_2$ | $(Sn,Sb)O_2$ | $SiO_2$ | $TiO_2$ |
| $SiO_2$ | $Fe_2O_3$ | $SiO_2$ | $(Sn,Sb)O_2$ |
| $SiO_2$ | $TiO_2/Fe_2O_3$ | $SiO_2$ | $TiO_2/Fe_2O_3$ |
| $SiO_2$ | $Cr_2O_3$ | $SiO_2$ | $TiO_2$ |
| $SiO_2$ | $Fe_2O_3$ | $SiO_2$ | $TiO_2$ |
| $SiO_2$ | TiO suboxides | $SiO_2$ | TiO suboxides |
| $SiO_2$ | $TiO_2$ | $SiO_2$ | $TiO_2 + SiO_2 + TiO_2$ |
| $SiO_2$ | $TiO_2 + SiO_2 + TiO_2$ | $SiO_2$ | $TiO_2 + SiO_2 + TiO_2$ |

In said embodiment all layers of the interference pigments are preferably deposited by microwave deposition, but part of the layers can also be applied by CVD (chemical vapour deposition) or by wet chemical coating:

| | | | |
|---|---|---|---|
| $SiO_2$ | $TiO_2$ | $Al_2O_3$ | $TiO_2$ |
| $SiO_2$ | $Fe_2TiO_5$ | $SiO_2$ | $TiO_2$ |
| $SiO_2$ | $TiO_2$ | $SiO_2$ | $Fe_2TiO_5/TiO_2$ |
| $SiO_2$ | $TiO_2$ | $SiO_2$ | $MoS_2$ |
| $SiO_2$ | $TiO_2$ | $SiO_2$ | $Cr_2O_3$ |
| $SiO_2$ | $TiO_2$ | $SiO_2$ | $TiO_2 + SiO_2 + TiO_2$ + Prussian Blue |

The metal oxide layers can be applied by means of oxidative gaseous phase decomposition of metal carbonyls (e.g. iron pentacarbonyl, chromium hexacarbonyl; EP-A-45 851), by means of hydrolytic gaseous phase decomposition of metal alcoholates (e.g. titanium and zirconium tetra-n- and -iso-propanolate; DE-A-41 40 900) or of metal halides (e.g. titanium tetrachloride; EP-A-338 428), by means of oxidative decomposition of organyl tin compounds (especially alkyl tin compounds such as tetrabutyltin and tetramethyltin; DE-A-44 03 678) or by means of the gaseous phase hydrolysis of organyl silicon compounds (especially di-tert-butoxyacetoxysilane) described in EP-A-668 329, it being possible for the coating operation to be carried out in a fluidised-bed reactor (EP-A-045 851 and EP-A-106 235). Layers of oxides of the metals zirconium, titanium, iron and zinc, oxide hydrates of those metals, iron titanates, titanium suboxides or mixtures thereof can be applied by precipitation by a wet chemical method, it being possible, where appropriate, for the metal oxides to be reduced. In the case of the wet chemical coating, the wet chemical coating methods developed for the production of pearlescent pigments may be used; these are described, for example, in DE-A-14 67 468, DE-A-19 59 988, DE-A-20 09 566, DE-A-22 14 545, DE-A-22 15 191, DE-A-22 44 298, DE-A-23 13 331, DE-A-25 22 572, DE-A-31 37 808, DE-A-31 37 809, DE-A-31 51 343, DE-A-31 51 354, DE-A-31 51 355, DE-A-32 11 602 and DE-A-32 35 017, DE 195 99 88, EP-A-892832, EP-A-753545, EP-A-1213330, WO93/08237, WO98/53001, WO98/12266, WO98/38254, WO99/20695, WO00/42111 and WO03/6558.

The metal oxide of high refractive index is preferably $TiO_2$ and/or iron oxide, and the metal oxide of low refractive index is preferably $SiO_2$. Layers of $TiO_2$ can be in the rutile or anastase modification, wherein the rutile modification is preferred. $TiO_2$ layers can also be reduced by known means, for example ammonia, hydrogen, hydrocarbon vapor or mixtures thereof, or metal powders, as described in EP-A-735,114, DE-A-3433657, DE-A-4125134, EP-A-332071, EP-A-707, 050 or WO93/19131.

In a particularly preferred embodiment the present invention is directed to $SiO_2$ flakes having a thickness of 130 to 170 nm, comprising a titanium dioxide layer having a thickness of 60 nm to 120 nm.

The $SiO_2$ flakes are not of a uniform shape. Nevertheless, for purposes of brevity, the flakes will be referred to as having a "diameter." The silicon oxide flakes have a high plane-parallelism and a defined thickness in the range of ±10%, especially ±5% of the average thickness. The $SiO_2$ flakes have a thickness of from 130 to 170 nm, especially from 140 to 160 nm, very especially about 150 nm. It is presently preferred that the diameter of the flakes be in a preferred range of about 1-60 μm with a more preferred range of about 5-40 μm. Thus, the aspect ratio of the flakes of the present invention is in a preferred range of about 6 to 462 with a more preferred range of about 31 to 286.

The titanium dioxide layer is preferably deposited by microwave deposition, but can, in principal, as described above also be applied by CVD (chemical vapour deposition) or by wet chemical coating.

Hence, the present invention is directed to $SiO_2$ flakes having a thickness of 130 to 170 nm, especially 140 to 160 nm, very especially about 150 nm, comprising a titanium dioxide layer having a thickness of 60 nm to 120 nm, obtainable by the process of the present invention.

The titanium dioxide layer has a thickness of 60 nm to 120 nm, especially 80 to 100 nm, very especially about 90 nm.

It is possible to obtain pigments that are more intense in colour and more transparent by applying, on top of the $TiO_2$ layer, a metal oxide of "low" refractive index, that is to say a refractive index smaller than about 1.65, such as $SiO_2$, $Al_2O_3$, AlOOH, $B_2O_3$ or a mixture thereof, preferably $SiO_2$, and applying a further $Fe_2O_3$ and/or $TiO_2$ layer on top of the latter layer. Such multi-coated interference pigments comprising a silicon/silicon oxide substrate and alternating metal oxide layers of with high and low refractive index can be prepared in analogy to the processes described in WO98/53011 and WO99/20695, or preferably by using the process of the present invention.

Accordingly, in said embodiment the layer structure is as follows:
(A) a coating having a refractive index >1.65,
(B) a coating having a refractive index ≦1.65,
(C) optionally a coating having a refractive index >1.65, and
(D) optionally an outer protective layer.

The thickness of layer (B) is in the range of 70 to 130 nm, especially 90 to 110 nm, very especially about 100 nm. The thickness of layer (A) and (C) is in the range of 60 nm to 120 nm, especially 80 to 100 nm, very especially about 90 nm.

If the SiO$_2$ flakes comprise (A) a coating having a refractive index >1.65, and (B) a coating having a refractive index ≦1.65, and layer (B) is employed as protective layer, the protective layer has a thickness of from 2 to 250 nm thick, especially from 10 to 100 nm.

A particularly preferred embodiment relates to interference pigments containing at least two alternating layers of high and low refractive index, such as, for example, TiO$_2$/SiO$_2$, TiO$_2$/SiO$_2$/TiO$_2$, (SnO$_2$)TiO$_2$/SiO$_2$/TiO$_2$, TiO$_2$/SiO$_2$/TiO$_2$/SiO$_2$/TiO$_2$ or TiO$_2$/SiO$_2$/Fe$_2$O$_3$.

It is furthermore possible to subject the finished pigment to subsequent coating or subsequent treatment which further increases the light, weather and chemical stability or which facilitates handling of the pigment, especially its incorporation into various media. For example, the procedures described in DE-A-22 15 191, DE-A-31 51 354, DE-A-32 35 017 or DE-A-33 34 598 are suitable as subsequent treatment or subsequent coating.

Where appropriate, an SiO$_2$ protective layer can be applied on top of the titanium dioxide layer, for which the following method may be used: A soda waterglass solution is metered in to a suspension of the material being coated, which suspension has been heated to about 50-100° C., especially 70-80° C. The pH is maintained at from 4 to 10, preferably from 6.5 to 8.5, by simultaneously adding 10% hydrochloric acid. After addition of the waterglass solution, stirring is carried out for 30 minutes.

The effect pigments on basis of the SiO$_2$ flakes can be used for all customary purposes (see, for example, WO03/068868 and WO04/035693), for example for colouring polymers in the mass, coatings (including effect finishes, including those for the automotive sector) and printing inks (including offset printing, intaglio printing, bronzing and flexographic printing), and also, for example, for applications in cosmetics (see, for example, WO04/020530), in ink-jet printing (see, for example, WO04/035684), for dyeing textiles (see, for example, WO04/035911), glazes for ceramics and glass as well as laser marking of papers and plastics. Such applications are known from reference works, for example "Industrielle Organische Pigmente" (W. Herbst and K. Hunger, VCH Verlagsgesellschaft mbH, Weinheim/New York, 2nd, completely revised edition, 1995).

The effect pigments on basis of the SiO$_2$ flakes can be used with excellent results for pigmenting high molecular weight organic material.

The high molecular weight organic material for the pigmenting of which the pigments or pigment compositions according to the invention may be used may be of natural or synthetic origin. High molecular weight organic materials usually have molecular weights of about from $10^3$ to $10^8$ g/mol or even more. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

The effect pigments on basis of the SiO$_2$ flakes can be added in any tinctorially effective amount to the high molecular weight organic material being pigmented. A pigmented substance composition comprising a high molecular weight organic material and from 0.01 to 80% by weight, preferably from 0.1 to 30% by weight, based on the high molecular weight organic material, of an pigment according to the invention is advantageous. Concentrations of from 1 to 20% by weight, especially of about 10% by weight, can often be used in practice.

Plastics comprising the effect pigments on basis of the SiO$_2$ flakes in amounts of 0.1 to 50% by weight, in particular 0.5 to 7% by weight. In the coating sector, the pigments of the invention are employed in amounts of 0.1 to 10% by weight. In the pigmentation of binder systems, for example for paints and printing inks for intaglio, offset or screen printing, the pigment is incorporated into the printing ink in amounts of 0.1 to 50% by weight, preferably 5 to 30% by weight and in particular 8 to 15% by weight.

The effect pigments on basis of the SiO$_2$ flakes are also suitable for making-up the lips or the skin and for colouring the hair or the nails. The invention accordingly relates also to a cosmetic preparation or formulation comprising from 0.0001 to 90% by weight of a pigment, especially an effect pigment, according to the invention and from 10 to 99.9999% of a cosmetically suitable carrier material, based on the total weight of the cosmetic preparation or formulation.

The colorations obtained, for example in plastics, coatings or printing inks, especially in coatings or printing inks, more especially in coatings, are distinguished by excellent properties, especially by extremely high saturation, outstanding fastness properties, high color purity and/or high goniochromicity.

In another aspect the present invention is directed to highly lustrous pearl lustre titanium dioxide-containing pigments. Such a pearl lustre pigment has a multilayer structure, where, on a core of platelet shaped titanium dioxide, there follows a layer of another metal oxide or metal oxide hydrates. Examples of other metal oxides or metal oxide hydrates which are applied to the titanium dioxide are Fe$_2$O$_3$, Fe$_3$O$_4$, FeOOH, Cr$_2$O$_3$, CuO, Ce$_2$O$_3$, Al$_2$O$_3$, SiO$_2$, BiVO$_4$, NiTiO$_3$, CoTiO$_3$ and also antimony-doped, fluorine-doped or indium-doped tin oxide. In a particular embodiment of the novel pigment, on the $1^{st}$ layer of another metal oxide or metal oxide hydrate is additionally present a $2^{nd}$ layer of a further metal oxide or metal oxide hydrate. This further metal oxide or metal oxide hydrate is aluminium oxide or aluminium oxide hydrate, silicon dioxide or silicon dioxide hydrate, Fe$_2$O$_3$, Fe$_3$O$_4$, FeOOH, TiO$_2$, ZrO$_2$, Cr$_2$O$_3$ as well as antimony-doped, fluorine-doped or indium-doped tin oxide, wherein the metal oxide of the first layer is different from that of the second layer.

These titanium dioxide platelets have a thickness of between 10 nm and 500 nm, preferably between 40 and 150 nm. The extent in the two other dimensions is between 2 and 200 μm and in particular between 5 and 50 μm.

The layer of another metal oxide which is applied to the titanium dioxide platelets has a thickness of 5 to 300 nm, preferably between 5 and 150 nm.

Additionally, the coating of the titanium dioxide platelets, after drying in between, can also be carried out with metal oxides or metal oxide hydrates, for example, in a fluidized bed reactor by means of gas-phase coating, it being possible, for example, to use the processes for the preparation of pearl lustre pigments proposed in EP 0,045,851 and EP 0,106,235.

While it is preferred that all metal oxide layers are deposited using microwave radiation, part of the metal oxides can be deposited by conventional wet chemical methods:
When coating with haematite ($Fe_2O_3$), the starting materials can be either iron(III) salts, as is described, for example, in U.S. Pat. No. 3,987,828 and U.S. Pat. No. 3,087,829, or iron(II) salts, as described in U.S. Pat. No. 3,874,890, the initially formed coating of iron(II) hydroxide being oxidized to iron(III) oxide hydrate. Iron(III) salts are preferably used as starting materials.

Coating with magnetite ($Fe_3O_4$) is carried out by hydrolysis of an iron(II) salt solution, for example, iron(II) sulphate, at a pH of 8.0 in the presence of potassium nitrate. The particular precipitation examples are described in EP-A-0659843.

For better adhesion of the iron oxide layers to the titanium dioxide platelets it is expedient to apply a tin oxide layer first.

Another metal oxide which is preferably deposited on the titanium dioxide platelets is chromium oxide. The deposition can easily be effected by means of thermal hydrolysis, which occurs in the volatilization of ammonia from an aqueous solution of a hexaminechromium(II) derivative, or by thermal hydrolysis of a chromium salt solution which is buffered with borax. Coating with chromium oxide is described in U.S. Pat. No. 3,087,828 and U.S. Pat. No. 3,087,829.

The pigments do not have to be calcined in every case. For certain applications drying at temperatures of 110° C. is sufficient. If the pigment is calcined, temperatures between 400° C. and 1000° C. are set, the preferred range being between 400° C. and 700° C.

It is additionally possible to subject the pigments to an aftercoating or aftertreatment which further increases the light stability, weathering resistance and chemical stability or facilitates the handling of the pigment, especially its incorporation into different media. Examples of suitable aftercoating techniques are those described, for example, in DE-C 22 15 191, DE-A 31 51 354, DE-A 32 35 017 or DE-A 33 34 598. Owing to the fact that the properties of the novel pigments are already very good without these additional measures, these optional additionally applied substances make up only from about 0 to 5% by weight, in particular from about 0 to 3% by weight, of the overall pigment.

Goniochromatic luster pigments based on multiply coated iron oxide platelets comprise at least one layer packet comprising
A) a colorless coating having a refractive index $n \leq 1.8$, and
B) a colorless coating having a refractive index $\geq 2.0$.

The size of the iron oxide platelets is not critical per se and can be adapted to the particular application intended. In general, the platelets have mean largest diameters from about 1 to 50 µm, preferably from 5 to 20 µm. The thickness of the platelets is generally within the range from 10 to 500 nm.

The colorless low refractive coating (A) has a refractive index $n \leq 1.8$, preferably $n \leq 1.6$. Examples of such materials are given below. Particularly suitable materials include for example metal oxides and metal oxide hydrates such as silicon oxide, silicon oxide hydrate, aluminum oxide, aluminum oxide hydrate and mixtures thereof, preference being given to silicon oxide (hydrate).

The geometric layer thickness of the coating (A) is generally within the range from 50 to 800 nm, preferably within the range from 100 to 600 nm. Since the layer (A) essentially determines the interference colors of the pigments, it has a minimum layer thickness of about 200 nm for luster pigments which have just one layer packet (A)+(B) and which exhibit a particularly pronounced color play and hence are also preferred. If a plurality (e.g., 2, 3 or 4) of layer packets (A)+(B) are present, the layer thickness of (A) is preferably within the range from 50 to 200 nm.

The colorless high refractive coating (B) has a refractive index $n \geq 2.0$, especially $n \geq 2.4$. Examples of such materials are given below. Particularly suitable layer materials (B) include not only metal sulfides such as zinc sulfide but especially metal oxides and metal oxide hydrates, for example titanium dioxide, titanium oxide hydrate, zirconium dioxide, zirconium oxide hydrate, tin dioxide, tin oxide hydrate, zinc oxide, zinc oxide hydrate and mixtures thereof, preference being given to titanium dioxide and titanium oxide hydrate and their mixtures with up to about 5% by weight of the other metal oxides, especially tin dioxide.

The coating (B) preferably has a smaller layer thickness than the coating (A). Preferred geometric layer thicknesses for coating (B) range from about 5 to 50 nm, especially from 10 to 40 nm.

The coating (B), which is preferred according to the present invention, consists essentially of titanium dioxide.

In said embodiment all layers of the interference pigments are preferably deposited by microwave deposition, but part of the layers can also be applied by CVD (chemical vapour deposition) or by wet chemical coating:

The core material of the effect pigments may be suspended in the aqueous solution of a fluorine scavenger via stirring or other forms of agitation. Said fluorine scavenger is preferably any compound that can scavenge fluorine ion in aqueous solution such as boric acid, sodium borate, ammonium borate, boron anhydride, boron monoxide, particularly preferably boric acid. In one embodiment of the invention, boric acid is used. The concentration of the boric acid solution is at least that which is required to scavenge fluoride ion during the deposition of the metal oxide coating on the core material. In one embodiment an excess of the boric acid is used as it may be removed by washing with water. Typically the boric acid is used in the range of about 0.01~0.5 M, preferably about 0.04~0.1M. The temperature of the boric acid solution is between the freezing point and the boiling point of the circulating media without the application of pressure. The process can be conveniently carried out between about 15° C. and about 95° C.

The oxides of elements of the groups 3 to 15 of the periodic table are deposited on the core material in the process of the present invention by adding an aqueous solution of a fluorine containing metal complex which is a precursor of the desired metal oxide and applying microwave energy. Generally, the aqueous solution is added continuously to the suspended core material in order to limit the precipitation of the metal oxide rather than deposition onto the pigment particle. The metal oxides that are suitable for coating the substrate material and subsequent layers of metal oxide are well known in the art and include $TiO_2$, $ZrO_2$, $CoO$, $SiO_2$, $SnO_2$, $GeO_2$, $ZnO$, $Al_2O_3$, $V_2O_5$, $Fe_2O_3$, $Cr_2O_3$, $PbTiO_3$ or $CuO$ or a mixture thereof. Particular preference is given to titanium dioxide.

The precursor solution that forms the desired metal oxide is preferably an aqueous solution of one or a combination of the following material:
(a) soluble metal fluoride salt,
(b) soluble metal fluorine complex, or
(c) any mixture that forms said salt or complex.

Examples include ammonium hexafluorotitanate; ammonium hexafluorostanate; ammonium hexafluorosilicate; iron (III) chloride, hydrofluoric acid and ammonium fluoride mixture; aluminum(III) chloride, hydrofluoric acid, and ammonium fluoride mixtures; ammonium hexafluorogermanate; combination of indium(III) fluoride trihydrate and ammonium hexafluorostanate. In the last example metal oxide layers are formed comprising more than one metal oxide, i.e. an indium tin oxide layer. The concentration of the fluorine containing metal complex is not critical to the process and is dictated by what is easy to handle because the mixture can be irradiated until the desired thickness is obtained. Thus, the concentration may range from about 0.01 M up to a saturated solution. In one embodiment of the invention a range of about 0.1 M to about 0.2 M is used, based upon the total amount of aqueous solution.

For producing a mixed interference/absorption effect pigment, the metal oxide layer of dielectric material is preferably a colored (selectively absorbing, not gray or black) oxide or colored mixed oxide of elements of groups 5 to 12. A most preferred metal oxide layer comprises $Fe_2O_3$.

For producing a pure interference pigment, the metal oxide layer is preferably a substantially colorless oxide of an element of groups 3 or 4. A most preferred metal oxide layer comprises $TiO_2$.

The thickness of the metal oxide coating is that which produces a semi-transparent or transparent coating onto the core material which exhibits an optical goniochromatic effect. The film thickness will vary dependent upon the pigment substrate and the optical goniochromatic effect desired.

The thickness of the layers is not critical per se and will in general range from 1 to 500 nm, preferably from 10 to 300 nm. Different oxides at different thickness produce different colors, depending on the refraction index of the oxide.

Any available microwave sources can be used. Furthermore, the frequency of the microwave, if the source is adjustable, can be tuned to promote deposition of metal oxide onto the surface.

Once the addition of metal precursor material is completed and the desired metal oxide layer thickness is achieved, the metal core suspension can be filtered and washed with deionized water, dried and calcined at a temperature of about 100 to 900° C., preferably about 400 to about 600° C., especially about 450 to about 500° C., for about 15 to 30 minutes, most preferably under a non-oxidizing atmosphere.

Optionally, the effect pigments can be provided with an additional, outermost semi-transparent light absorbing metal oxide layer formed of, for example, $Fe_2O_3$, CoO, $CoTiO_3$, $Cr_2O_3$, $Fe_2TiO_5$ or a silicon suboxide $SiO_x$, wherein x is less than one and preferably about 0.2. Said light absorbing metal oxide layer absorbs at least a portion of all but certain wavelengths of light to provide an enhanced impression of the selected color. The $SiO_x$ layer may be formed by known methods, for example, by thermally decomposing $SiH_4$ in the presence of the coated metal cores, in a fluidized bed reactor. The presence of the additional light absorbing layer can increase both the chroma and the color shift optical variance of the pigment. The additional light absorbing layer should have a thickness of 5 to 50 nm, preferably 5 to 30 nm.

The following example is for illustrative purposes only and is not to be construed to limit the scope of the instant invention in any manner whatsoever.

EXAMPLE 1

An endless circulating belt of polyester (width: 0.3 m, thickness: 0.3 mm, speed: 0.5 m/min) is passed through an ethanol solution of diphenic acid. The belt is then dried with 80° C. hot air before entering the microwave chamber so that a layer of diphenic acid is coated on both sides of the belt. The belt is then immersed into a bath of 1 L 0.1 M ammonium borate aqueous solution in the microwave chamber. An aqueous solution of 1.0 M ammonium hexafluorosilicate is added to the ammonium borate bath at 2 ml/min. The temperature of the bath is adjusted to 80 to 90° C. by microwave irradiation. The belt is sprayed with water to remove residual reactants after it moves out of the microwave chamber. It is hot air dried and introduced into an ethanol bath at 50° C. The belt continues to the cleaning section where it is brushed with cleaning agent, rinsed with water, and dried with hot air. The platelets of silicon dioxide are collected through the bottom of the ethanol bath by filtration and rinsing with water. The platelets have a layer thickness of 150 nm±10 nm.

The invention claimed is:

1. A process for the preparation of a plane-parallel structure comprising at least one dielectric layer consisting of one or more oxides of a metal selected from groups 3 to 15 of the periodic table, which comprises the steps of:
    (a) applying a thin film of the dielectric material on a flexible belt, by passing the belt through an aqueous solution of a fluorine scavenger and one or more fluorine containing metal complexes which are the precursors of the desired metal oxide coating, which belt absorbs microwave radiation better than the solution; and subjecting said solution to microwave radiation to deposit the metal oxide onto said flexible belt, wherein the aqueous solution of the fluorine containing metal complex is added continuously in order that the metal oxide grows on the belt rather than precipitate into bulk of the reaction medium,
    wherein step (a) can optionally be repeated using different fluorine containing metal complexes to produce one or more metal oxide layers or a gradient of concentration of 2 different metal oxides across the thickness;
    (b) separating the resulting layer from the flexible belt as plane-parallel structures.

2. The process according to claim 1, wherein the flexible belt is a continuous flexible belt.

3. The process according to claim 2, wherein the continuous flexible belt is coated with a separating agent before step (a) and (b) separating the resulting layer from the flexible belt is achieved by dissolving the separating agent in a suitable solvent.

4. The process according to claim 1, wherein the fluorine scavenger is selected from the group consisting of boric acid, an alkali metal borate, ammonium borate, boron anhydride and boron monoxide.

5. The process according to claim 1, wherein the fluorine containing metal complex is selected from the group consisting of ammonium hexafluorotitanate; ammonium hexafluorostanate; ammonium hexafluorosilicate; iron(III) chloride, hydrofluoric acid and ammonium fluoride mixtures; aluminum(III) chloride, hydrofluoric acid and ammonium fluoride mixtures; ammonium hexafluorogermanate; indium(III) fluoride, hydrofluoric acid and ammonium fluoride mixtures; and combinations of indium(III) fluoride trihydrate and ammonium hexafluorostanate.

6. The process according to claim 1, wherein the metal oxide is titanium dioxide and the fluorine containing metal complex is selected from the group consisting of ammonium hexafluorotitanate, a complex prepared from ammonium fluoride and titanium chloride or titanium chloride, ammonium fluoride and hydrogen fluoride, or the metal oxide is iron oxide and the fluorine containing metal complex is selected from the group iron(III) chloride, hydrofluoric acid and ammonium fluoride mixtures.

7. The process according to claim 1, wherein the metal oxide is silicon dioxide and the fluorine containing metal complex is ammonium hexafluorosilicate or ammonium pentafluorosilicate.

8. The process according to claim 3, wherein the fluorine containing metal complex of step (a) is ammonium hexafluorotitanate, an ammonium fluorosilicate salt, or iron(III) chloride/ammonium fluoride, wherein after dissolving of the separating agent in an organic liquid, plane-parallel structures of $TiO_2$, $SiO_2$, or $Fe_2O_3$ are produced.

9. The process of claim 3 further comprising the step of:
(a') passing the belt through an aqueous solution of a fluorine scavenger and one or more fluorine containing metal complexes which are the precursors of the desired metal oxide coating which is different from the oxide coating in step (a); and subjecting said solution to microwave radiation to deposit the metal oxide onto said flexible belt, wherein step (a') is conducted after step (a).

10. The process according to claim 9, wherein step (a) and /or (a') are repeated to form multilayer plane-parallel structures having alternating layers of metal oxides.

11. The process according to claim 1, wherein the fluorine scavenger is sodium borate.

12. The process according to claim 3, wherein the fluorine scavenger is selected from the group consisting of boric acid, an alkali metal borate, ammonium borate, boron anhydride and boron monoxide.

13. The process according to claim 3, wherein the fluorine containing metal complex is selected from the group consisting of ammonium hexafluorotitanate; ammonium hexafluorostanate; ammonium hexafluorosilicate; iron(III) chloride, hydrofluoric acid and ammonium fluoride mixtures; aluminum(III) chloride, hydrofluoric acid and ammonium fluoride mixtures; ammonium hexafluorogermanate; indium(III) fluoride, hydrofluoric acid and ammonium fluoride mixtures; and combinations of indium(III) fluoride trihydrate and ammonium hexafluorostanate.

14. The process according to claim 4, wherein the fluorine containing metal complex is selected from the group consisting of ammonium hexafluorotitanate; ammonium hexafluorostanate; ammonium hexafluorosilicate; iron(III) chloride, hydrofluoric acid and ammonium fluoride mixtures; aluminum(III) chloride, hydrofluoric acid and ammonium fluoride mixtures; ammonium hexafluorogermanate; indium(III) fluoride, hydrofluoric acid and ammonium fluoride mixtures; and combinations of indium(III) fluoride trihydrate and ammonium hexafluorostanate.

15. The process according to claim 3, wherein the metal oxide is titanium dioxide and the fluorine containing metal complex is selected from the group consisting of ammonium hexafluorotitanate, a complex prepared from ammonium fluoride and titanium chloride or titanium chloride, ammonium fluoride and hydrogen fluoride, or the metal oxide is iron oxide and the fluorine containing metal complex is selected from the group iron(III) chloride, hydrofluoric acid and ammonium fluoride mixtures.

16. The process according to claim 4, wherein the metal oxide is titanium dioxide and the fluorine containing metal complex is selected from the group consisting of ammonium hexafluorotitanate, a complex prepared from ammonium fluoride and titanium chloride or titanium chloride, ammonium fluoride and hydrogen fluoride, or the metal oxide is iron oxide and the fluorine containing metal complex is selected from the group iron(III) chloride, hydrofluoric acid and ammonium fluoride mixtures.

17. The process according to claim 3, wherein the metal oxide is silicon dioxide and the fluorine containing metal complex is ammonium hexafluorosilicate or ammonium pentafluorosilicate.

18. The process according to claim 4, wherein the metal oxide is silicon dioxide and the fluorine containing metal complex is ammonium hexafluorosilicate or ammonium pentafluorosilicate.

19. The process of claim 10, wherein the multilayer plane-parallel structures have alternating layers of metal oxides A/A'/A, or A/A'/A/A'/A/A'/A, wherein A, the metal oxide layer obtained in step (a), is $TiO_2$, and A', the metal oxide layer obtained in step (a'), is $SiO_2$; or the multilayer plane-parallel structures have alternating layers of metal oxides B/B'/B/B'/B, wherein B the metal oxide layer obtained in step (a), is $SiO_2$, and B', the metal oxide layer obtained in step (a'), is $TiO_2$.

* * * * *